United States Patent
Chung

(10) Patent No.: US 7,913,682 B2
(45) Date of Patent: Mar. 29, 2011

(54) BARBEQUE GRILL HAVING FOLDABLE STANDS

(76) Inventor: Kiosky Chung, Taichung (TW)

(*) Notice: Subject to any disclaimer, the term of this patent is extended or adjusted under 35 U.S.C. 154(b) by 703 days.

(21) Appl. No.: 12/017,018

(22) Filed: Jan. 19, 2008

(65) Prior Publication Data

US 2009/0183726 A1    Jul. 23, 2009

(51) Int. Cl.
*A47J 37/07* (2006.01)
(52) U.S. Cl. ......... 126/25 R; 126/9 R; 126/9 B; 126/30; 126/40; 126/50; 248/150
(58) Field of Classification Search ............... 126/25 R, 126/30, 25 AA, 9 R, 9 B, 38, 40, 39 B, 50, 126/98, 304 R, 305, 306, 304 A; 248/149, 248/150, 151, 152, 154
See application file for complete search history.

(56) References Cited

U.S. PATENT DOCUMENTS

| 4,022,414 | A | * | 5/1977 | Egger | 248/150 |
| 4,398,690 | A | * | 8/1983 | Rutledge | 248/150 |
| 5,289,957 | A | * | 3/1994 | Huang | 224/550 |
| 6,314,955 | B1 | * | 11/2001 | Boetcker | 126/9 R |
| 6,776,379 | B2 | * | 8/2004 | Sherer et al. | 248/150 |

* cited by examiner

*Primary Examiner* — Alfred Basichas

(57) ABSTRACT

A barbeque grill includes a grill body and two stands foldably mounted on a bottom of the grill body. Each of the stands includes a support bracket, two support legs, two pivot units, two locking members, two fastening units, and two elastic members. Thus, each of the support legs is rotatable relative to the support bracket so that each of the support legs is foldable to fold each of the stands to reduce the whole volume of the barbeque grill, thereby facilitating packaging, storage and transportation of the barbeque grill. In addition, each of the support legs is locked onto or unlocked from the support bracket by releasing or pulling each of the locking members so that each of the support legs is expandable and foldable easily and quickly.

17 Claims, 7 Drawing Sheets

BARBEQUE GRILL HAVING FOLDABLE STANDS

BACKGROUND OF THE INVENTION

1. Field of the Invention

The present invention relates to a barbeque grill, and more particularly to a barbeque grill for broiling a food, such as meat and the like.

2. Description of the Related Art

A conventional barbeque grill comprises a grill body and a stand mounted on the bottom of the grill body. The stand includes a plurality of support legs to lift the grill body to enhance the ventilating effect. However, the stand is fixed on the bottom of the grill body so that the legs of the stand cannot be folded when no in use, thereby causing inconvenience to a user in packaging, storage and transportation of the barbeque grill.

SUMMARY OF THE INVENTION

The present invention is to mitigate and/or obviate the disadvantage of the conventional barbeque grill.

The primary objective of the present invention is to provide a barbeque grill having foldable stands.

Another objective of the present invention is to provide a barbeque grill, wherein each of the two support legs is rotatable relative to the support bracket so that each of the two support legs is foldable to fold each of the two stands so as to reduce the whole volume of the barbeque grill, thereby facilitating packaging, storage and transportation of the barbeque grill.

A further objective of the present invention is to provide a barbeque grill, wherein each of the support legs is locked onto or unlocked from the support bracket by releasing or pulling the drive portion of each of the locking members so that each of the support legs is expandable and foldable easily and quickly, thereby facilitating a user expanding and folding each of the two stands.

In accordance with the present invention, there is provided a barbeque grill, comprising a grill body, and two opposite stands foldably mounted on a bottom of the grill body. Each of the two stands includes a support bracket mounted on the bottom of the grill body and having two opposite upright side plates each provided with a first positioning slot and a second positioning slot, two opposite support legs each rotatably mounted on the respective side plate of the support bracket by a respective pivot unit, and two locking members each movably mounted in the respective support leg by a respective fastening unit and each having a first end provided with a locking portion detachably inserted into one of the first positioning slot and the second positioning slot of the respective side plate of the support bracket to lock the respective support leg onto the support bracket and a second end provided with a drive portion protruding outwardly from the respective support leg.

Further benefits and advantages of the present invention will become apparent after a careful reading of the detailed description with appropriate reference to the accompanying drawings.

DETAILED DESCRIPTION OF THE INVENTION

Figure 1:
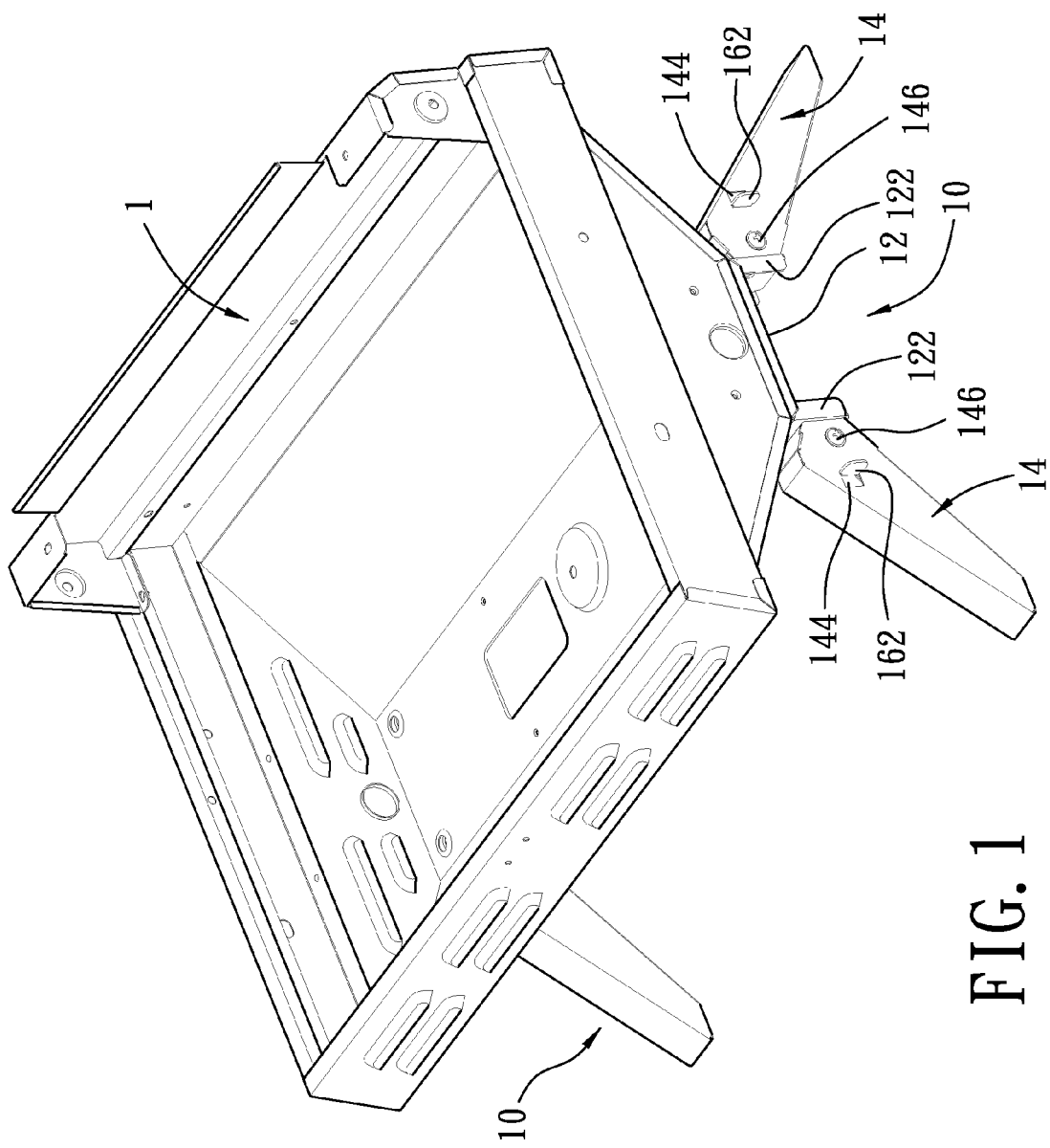
FIG. 1 is a perspective view of a barbeque grill in accordance with the preferred embodiment of the present invention.
Figure 2:
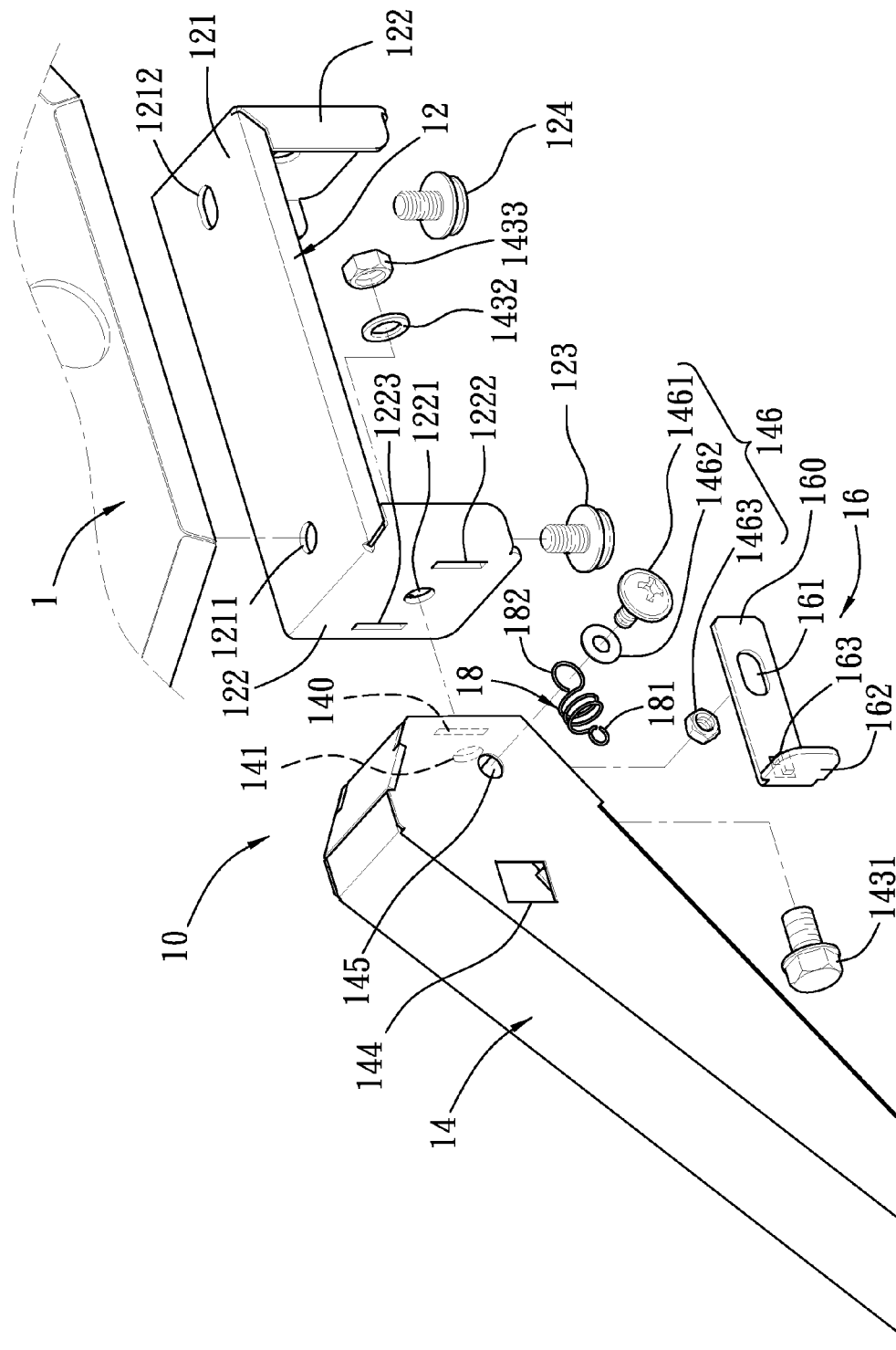
FIG. 2 is a partially exploded perspective view of the barbeque grill as shown in FIG. 1.

Referring to the drawings and initially to FIGS. 1-5, a barbeque grill in accordance with the preferred embodiment of the present invention comprises a grill body 1 and two opposite stands 10 foldably mounted on a bottom of the grill body 1.

Each of the two stands 10 includes a support bracket 12 mounted on the bottom of the grill body 1 and having two opposite upright side plates 122 each provided with a first positioning slot 1222 and a second positioning slot 1223, two opposite support legs 14 each rotatably mounted on the respective side plate 122 of the support bracket 12 by a respective pivot unit 143, two locking members 16 each movably mounted in the respective support leg 14 by a respective fastening unit 146 and each having a first end provided with a locking portion 160 detachably inserted into one of the first positioning slot 1222 and the second positioning slot 1223 of the respective side plate 122 of the support bracket 12 to lock the respective support leg 14 onto the support bracket 12 and a second end provided with a drive portion 162 protruding outwardly from the respective support leg 14, and two elastic members 18 each biased between the respective locking member 16 and the respective fastening unit 146 to push the locking portion 160 of the respective locking member 16 toward the respective side plate 122 of the support bracket 12.

The support bracket 12 of each of the two stands 10 has a substantially inverted U-shaped profile and has a horizontal fixing plate 121 located between the two side plates 122 and attached to the bottom of the grill body 1 by two locking bolts 123 and 124. The fixing plate 121 of the support bracket 12 of each of the two stands 10 is provided with two fixing holes 1211 and 1212 to allow passage of the two locking bolts 123 and 124. Each of the two side plates 122 of the support bracket 12 of each of the two stands 10 is provided with a through hole 1221 located between the first positioning slot 1222 and the second positioning slot 1223 to allow passage of the pivot unit 143.

Each of the two support legs 14 of each of the two stands 10 has a hollow inside and is rotatable about the respective pivot unit 143. Each of the two support legs 14 of each of the two stands 10 has an upright end face provided with a through bore 141 to allow passage of the respective pivot unit 143 and a passage 140 to allow passage of the respective locking member 16. Each of the two support legs 14 of each of the two stands 10 has an upright side face provided with an aperture 145 to allow passage of the respective fastening unit 146 and an opening 144 to allow passage of the drive portion 162 of the respective locking member 16.

Each of the two locking members 16 of each of the two stands 10 has a substantially L-shaped profile and has a mediate portion provided with an elongate guide slot 161 located between the locking portion 160 and the drive portion 162 and slidable on the respective fastening unit 146 when each of the two locking members 16 is movable mounted in the respective support leg 14. The drive portion 162 of each of the two locking members 16 protrudes outwardly from and is slidable in the opening 144 of the respective support leg 14. The second end of each of the two locking members 16 has a side provided with a locking hook 163.

The pivot unit 143 is located between the first positioning slot 1222 and the second positioning slot 1223 of the respective side plate 122 of the support bracket 12 and includes a pivot bolt 1431 mounted in the respective support leg 14 and extending through the through bore 141 of the respective support leg 14 and the through hole 1221 of the respective side plate 122 of the support bracket 12, a locking nut 1433 mounted in the support bracket 12 and screwed onto the pivot bolt 1431, and a washer 1432 mounted on the pivot bolt 1431 and located between the respective side plate 122 of the support bracket 12 and the locking nut 1433.

The fastening unit 146 is mounted on the respective support leg 14 and includes a threaded limit member 1461 extending through the aperture 145 of the respective support leg 14 and the guide slot 161 of the respective locking member 16, a locking nut 1463 screwed onto the threaded limit member 1461 and abutting the respective locking member 16, and a washer 1462 mounted on the threaded limit member 1461 and located between the threaded limit member 1461 and the respective locking member 16.

Each of the two elastic members 18 of each of the two stands 10 is mounted in the respective support leg 14 and has a ring-shaped first end 182 mounted on the threaded limit member 1461 of the fastening unit 146 and a ring-shaped second end 181 mounted on the locking hook 163 of the respective locking member 16.

Figure 3:
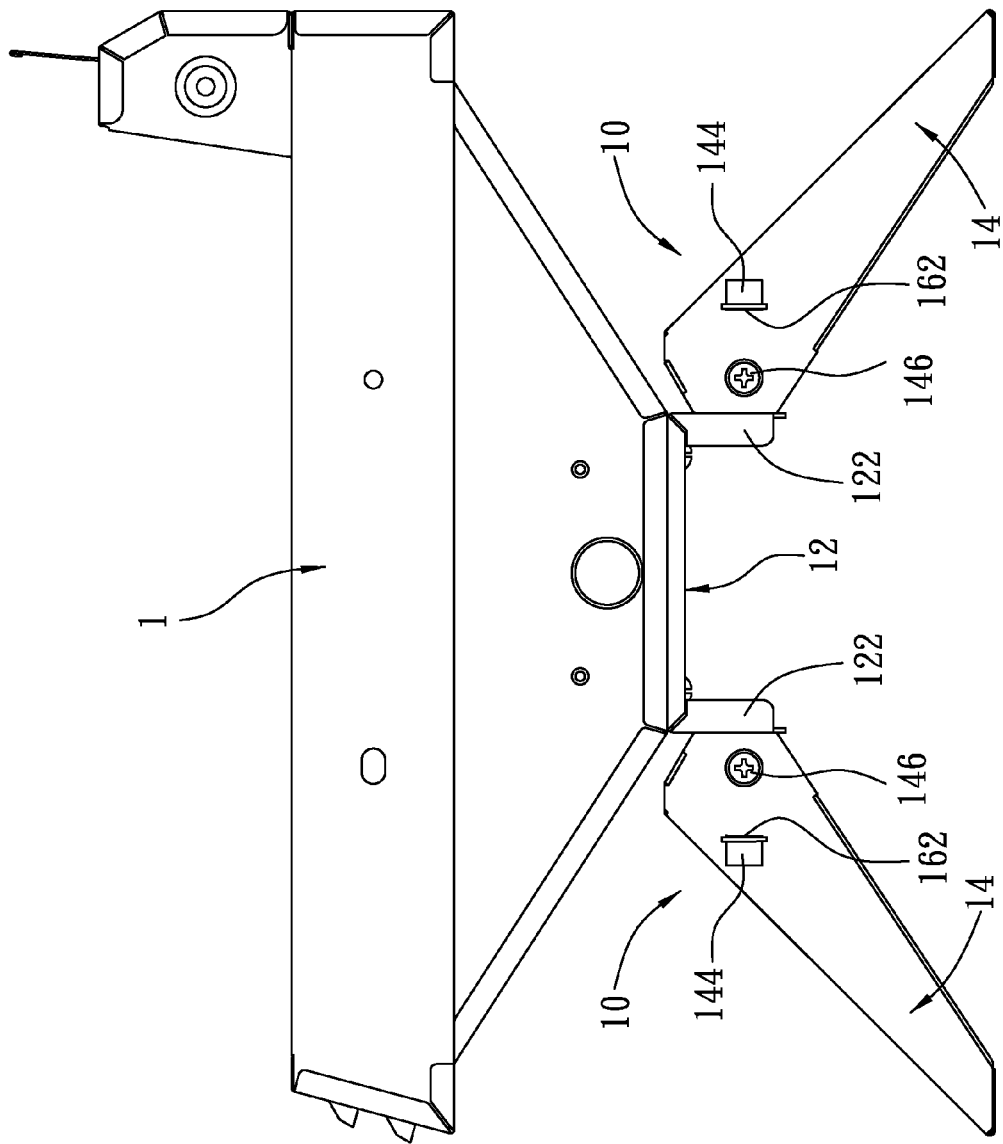
FIG. 3 is a front view of the barbeque grill as shown in FIG. 1.
Figure 4:
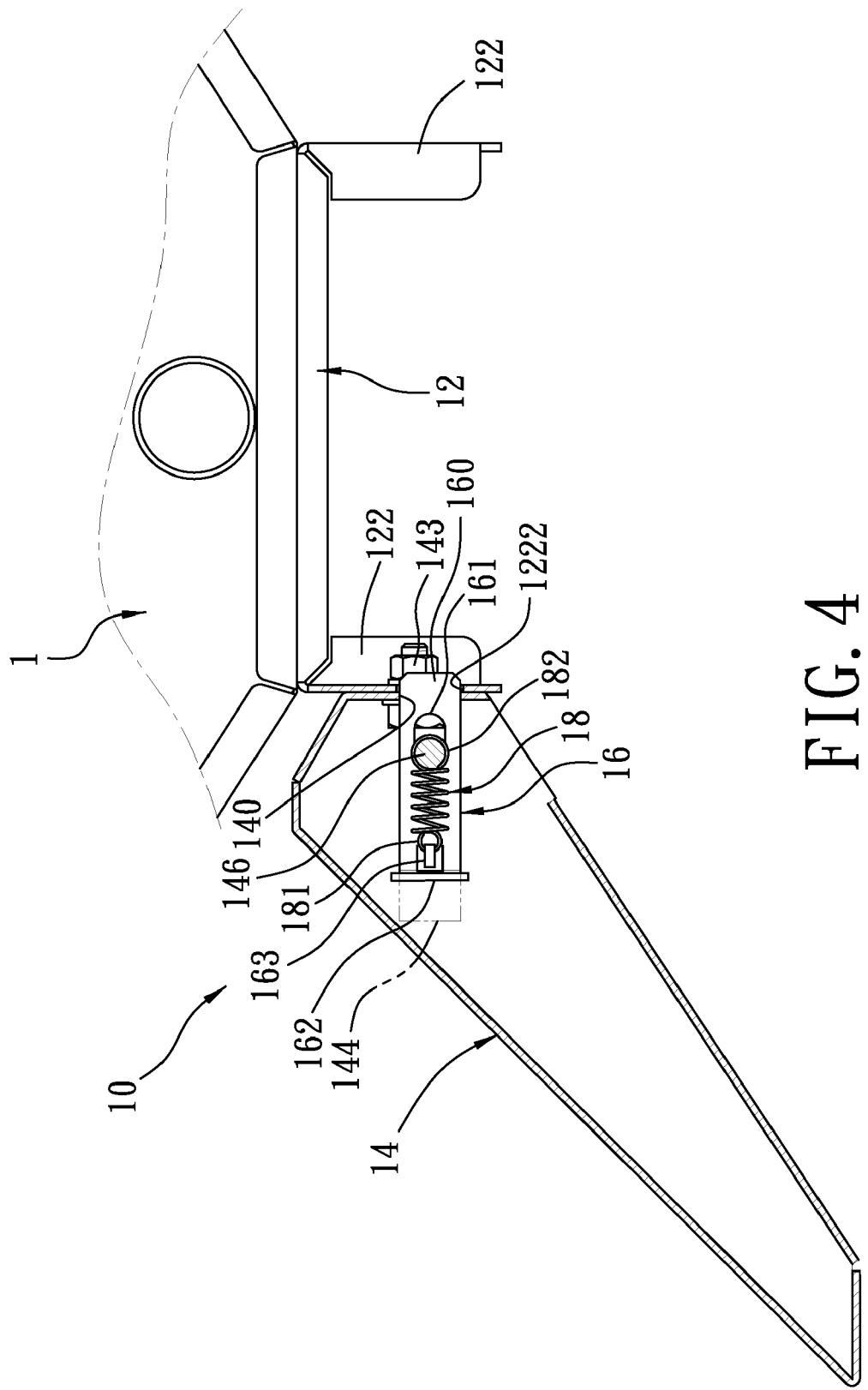
FIG. 4 is a partially cross-sectional view of the barbeque grill as shown in FIG. 3.
Figure 5:
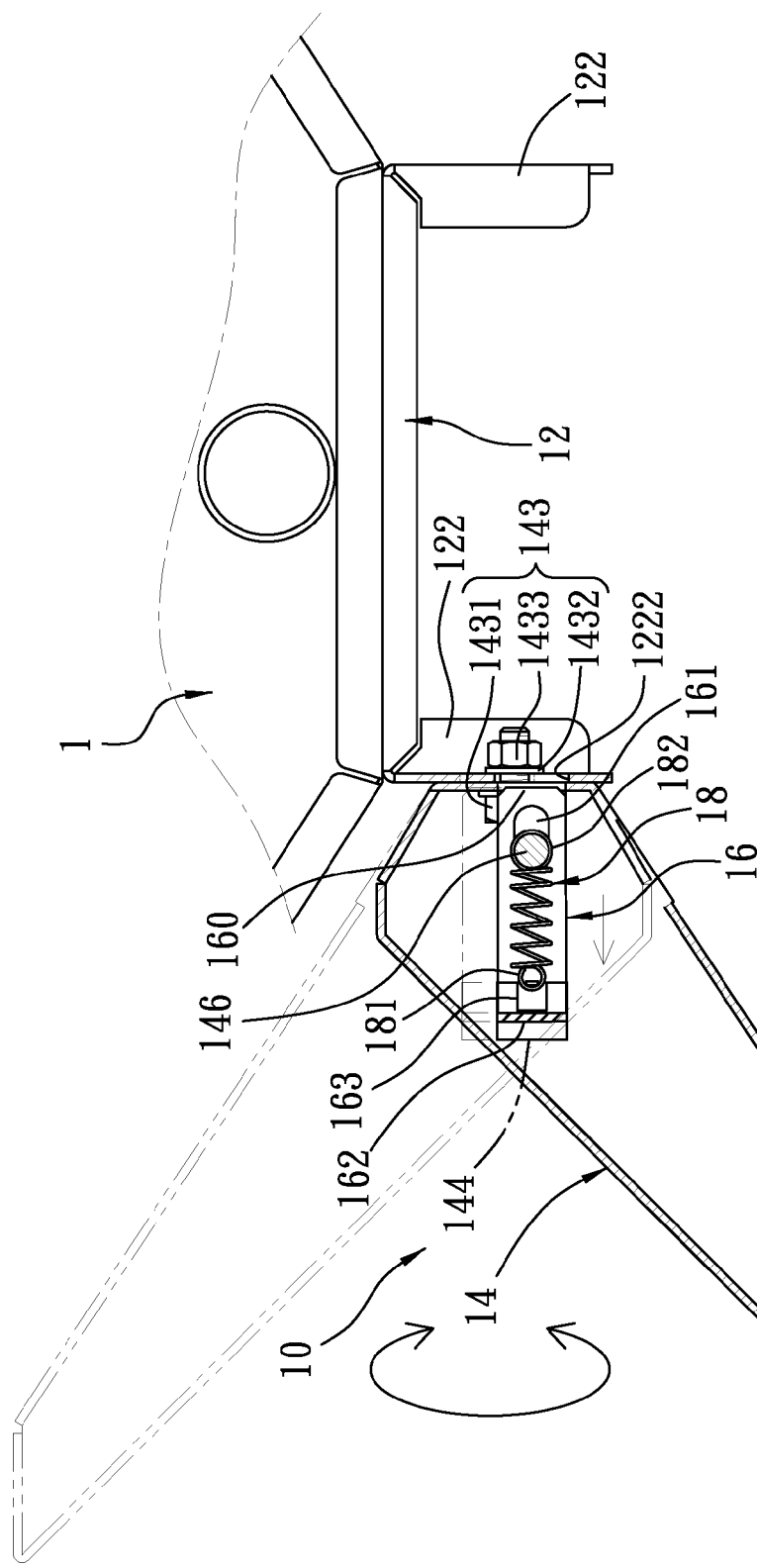
FIG. 5 is a schematic operational view of the barbeque grill as shown in FIG. 4.
Figure 6:
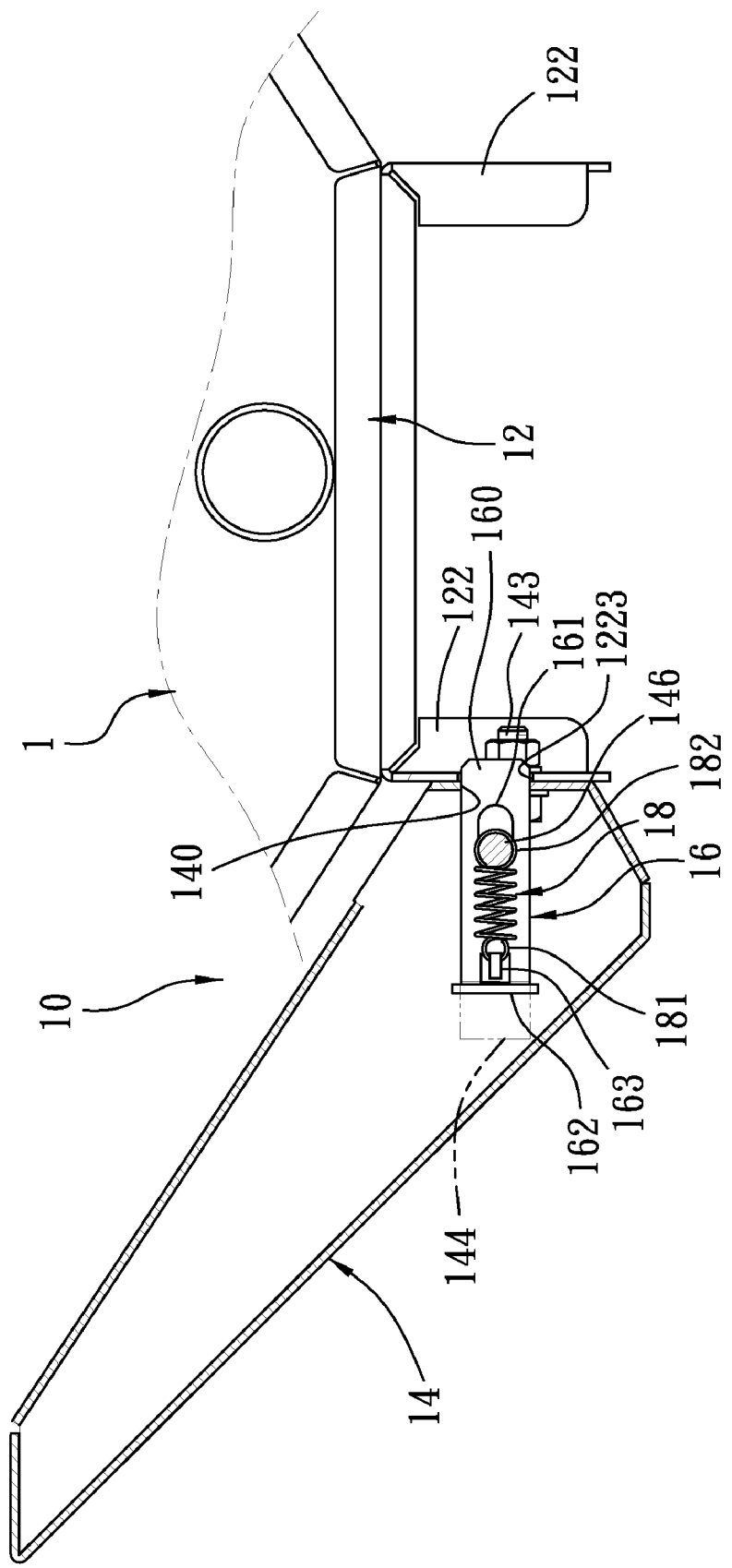
FIG. 6 is a schematic operational view of the barbeque grill as shown in FIG. 5.
Figure 7:
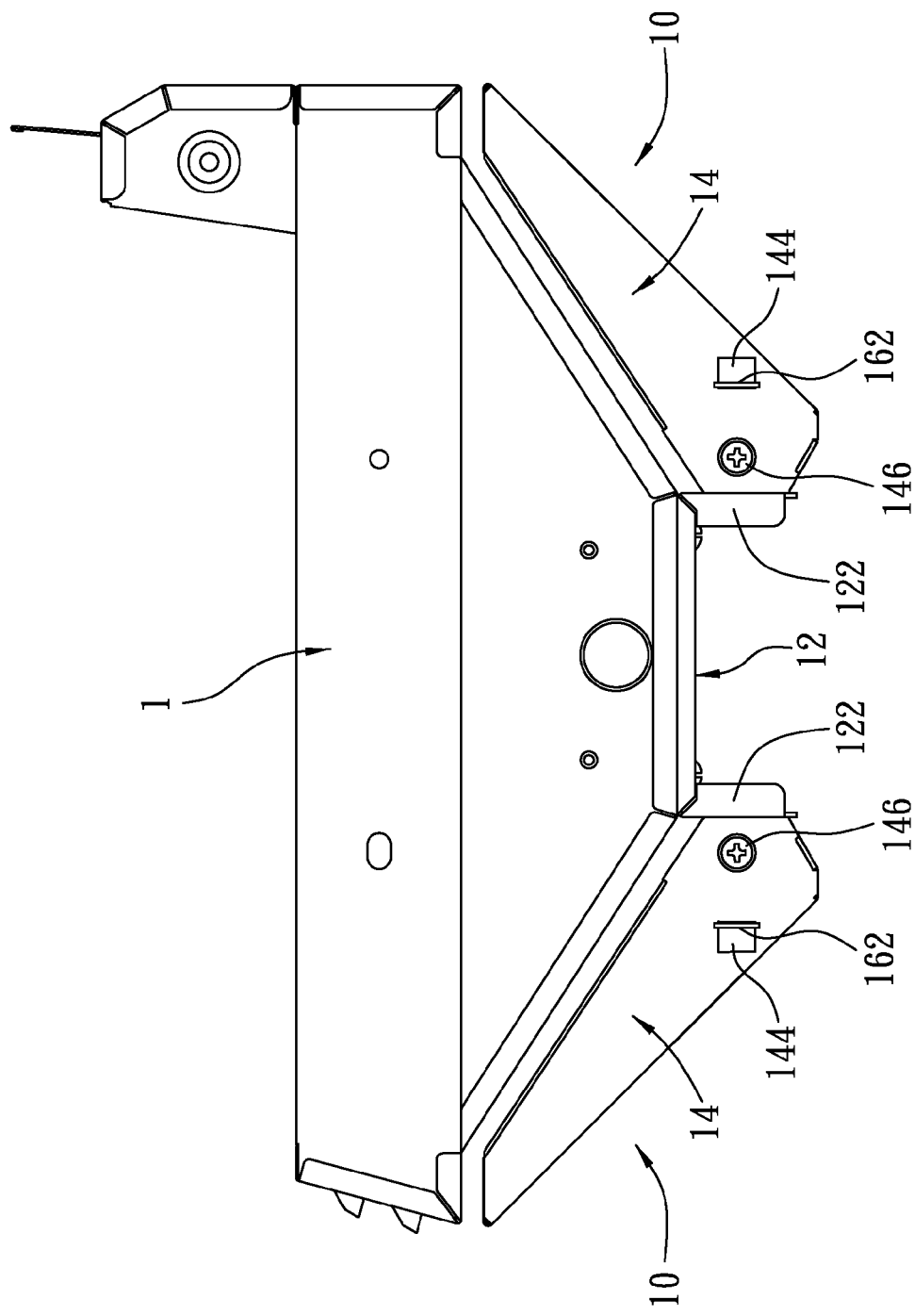
FIG. 7 is a schematic operational view of the barbeque grill as shown in FIG. 3.

In operation, referring to FIGS. 1-7, each of the two locking members 16 is movable outwardly relative to the respective side plate 122 of the support bracket 12 by pulling the drive portion 162 to detach the locking portion 160 of each of the two locking members 16 from the first positioning slot 1222 of the respective side plate 122 of the support bracket 12 so as to unlock the respective support leg 14 from the respective side plate 122 of the support bracket 12 so that each of the two support legs 14 is rotatable relative to the respective side plate 122 of the support bracket 12. Thus, each of the two support legs 14 is rotatable about the respective pivot unit 143 as shown in FIG. 5 to move upward from the position as shown in FIGS. 3 and 4 to the position as shown in FIGS. 6 and 7 so that each of the two support legs 14 is movable upward and folded. When the locking portion 160 of each of the two locking members 16 aligns with the second positioning slot 1223 of the respective side plate 122 of the support bracket 12, the locking portion 160 of each of the two locking members 16 is pushed by the restoring force of the respective elastic member 18 and is inserted into the second positioning slot 1223 of the respective side plate 122 of the support bracket 12 to lock the respective support leg 14 onto the support bracket 12.

Accordingly, each of the two support legs 14 is rotatable relative to the support bracket 12 so that each of the two support legs 14 is foldable to fold each of the two stands 10 so as to reduce the whole volume of the barbeque grill, thereby facilitating packaging, storage and transportation of the barbeque grill. In addition, each of the support legs 14 is locked onto or unlocked from the support bracket 12 by releasing or pulling the drive portion 162 of each of the locking members 16 so that each of the support legs 14 is expandable and foldable easily and quickly, thereby facilitating a user expanding and folding each of the two stands 10.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A barbeque grill, comprising:
    a grill body;
    two opposite stands foldably mounted on a bottom of the grill body; wherein
    each of the two stands includes:
    a support bracket mounted on the bottom of the grill body and having two opposite upright side plates each provided with a first positioning slot and a second positioning slot;
    two opposite support legs each rotatably mounted on the respective side plate of the support bracket by a respective pivot unit;
    two locking members each movably mounted in the respective support leg by a respective fastening unit and each having a first end provided with a locking portion detachably inserted into one of the first positioning slot and the second positioning slot of the respective side plate of the support bracket to lock the respective support leg onto the support bracket and a second end provided with a drive portion protruding outwardly from the respective support leg.

2. The barbeque grill in accordance with claim 1, wherein each of the two side plates of the support bracket of each of the two stands is provided with a through hole located between the first positioning slot and the second positioning slot to allow passage of the pivot unit;
    each of the two support legs of each of the two stands has an upright end face provided with a through bore to allow passage of the respective pivot unit.

3. The barbeque grill in accordance with claim 2, wherein the end face of each of the two support legs of each of the two stands is provided with a passage to allow passage of the respective locking member.

4. The barbeque grill in accordance with claim 2, wherein the pivot unit is located between the first positioning slot and the second positioning slot of the respective side plate of the support bracket.

5. The barbeque grill in accordance with claim 2, wherein the pivot unit includes:
    a pivot bolt mounted in the respective support leg and extending through the through bore of the respective support leg and the through hole of the respective side plate of the support bracket;
    a locking nut mounted in the support bracket and screwed onto the pivot bolt.

6. The barbeque grill in accordance with claim 5, wherein the pivot unit further includes:
    a washer mounted on the pivot bolt and located between the respective side plate of the support bracket and the locking nut.

7. The barbeque grill in accordance with claim 1, wherein each of the two support legs of each of the two stands has an upright side face provided with an aperture to allow passage of the respective fastening unit and an opening to allow passage of the drive portion of the respective locking member;
    each of the two locking members of each of the two stands has a mediate portion provided with an elongate guide slot located between the locking portion and the drive portion and slidable on the respective fastening unit when each of the two locking members is movable mounted in the respective support leg.

8. The barbeque grill in accordance with claim 7, wherein the drive portion of each of the two locking members protrudes outwardly from and is slidable in the opening of the respective support leg.

9. The barbeque grill in accordance with claim 7, wherein the fastening unit is mounted on the respective support leg and includes:
   a threaded limit member extending through the aperture of the respective support leg and the guide slot of the respective locking member;
   a locking nut screwed onto the threaded limit member and abutting the respective locking member.

10. The barbeque grill in accordance with claim 9, wherein the fastening unit further includes:
    a washer mounted on the threaded limit member and located between the threaded limit member and the respective locking member.

11. The barbeque grill in accordance with claim 9, wherein each of the two stands further includes two elastic members each biased between the respective locking member and the respective fastening unit to push the locking portion of the respective locking member toward the respective side plate of the support bracket.

12. The barbeque grill in accordance with claim 11, wherein
    the second end of each of the two locking members has a side provided with a locking hook;
    each of the two elastic members of each of the two stands is mounted in the respective support leg and has a ring-shaped first end mounted on the threaded limit member of the fastening unit and a ring-shaped second end mounted on the locking hook of the respective locking member.

13. The barbeque grill in accordance with claim 1, wherein each of the two support legs of each of the two stands is rotatable about the respective pivot unit.

14. The barbeque grill in accordance with claim 1, wherein the support bracket of each of the two stands has a substantially inverted U-shaped profile.

15. The barbeque grill in accordance with claim 1, wherein each of the two locking members of each of the two stands has a substantially L-shaped profile.

16. The barbeque grill in accordance with claim 1, wherein each of the two support legs of each of the two stands has a hollow inside.

17. The barbeque grill in accordance with claim 1, wherein the support bracket of each of the two stands has a horizontal fixing plate located between the two side plates and attached to the bottom of the grill body by two locking bolts.

* * * * *